W. F. Cochrane.
Mill Bolt.
N° 37,319. Patented Jan. 6, 1863.
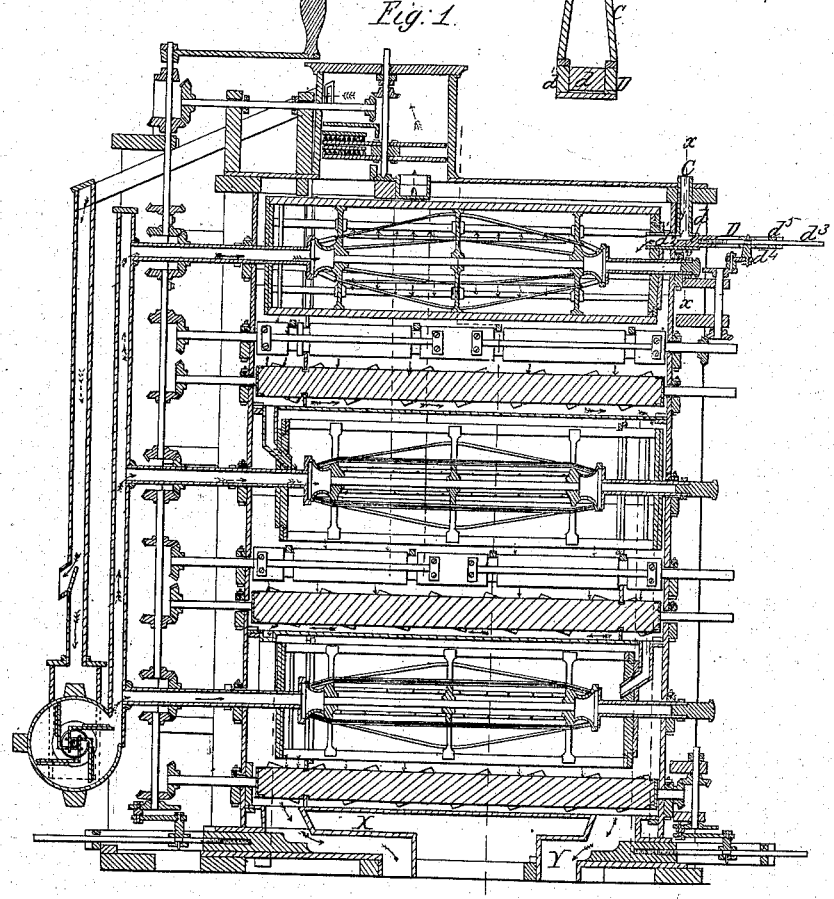
Witnesses:
Inventor:

UNITED STATES PATENT OFFICE.

WILLIAM F. COCHRANE, OF SPRINGFIELD, OHIO, ASSIGNOR TO HIMSELF AND WARDER & CHILD, OF SAME PLACE.

IMPROVEMENT IN BOLTING FLOUR.

Specification forming part of Letters Patent No. 37,319, dated January 6, 1863.

CASE C.

*To all whom it may concern:*

Be it known that I, WILLIAM F. COCHRANE, of Springfield, in the county of Clarke and State of Ohio, have invented certain new and useful Improvements in Bolting-Chests for Flouring-Mills, of which the following is a full, clear, and exact description, reference being had to the accompanying drawings, which make part of this specification, and in which—

Figure 1 represents a vertical longitudinal section through a bolting-chest embracing my improvements; and Fig. 2, a vertical section through the feed-spout and pump, detached, at the line $x\ x$ of Fig. 1.

It is found by experiment that the process of bolting flour is much facilitated by the use of a current of air to force the flour through the meshes of the bolting-cloths, but this process requires an almost entire remodeling of the machinery heretofore employed for this purpose.

I have ascertained that when the meal is fed to the bolting-reel by a spout or trough of uniform size it has, under certain conditions of atmosphere, a tendency to clog or pack.

It is the object of one branch of my invention to obviate this objection, and to this end my improvement consists, first, in making the spouts which feed the meal in the shape of a frustum of a cone or pyramid, with its smallest end upward, whereby the tendency of the flour to pack in the spout is obviated. Where atmospheric pressure is employed to assist the bolting process it becomes necessary to devise some means whereby the meal may be fed to the bolting-reel without permitting the air to escape through the feeding-spout, as such escape would be attended with many inconveniences.

Another branch of my improvement, therefore, relates to certain devices to attain these ends, and my improvements for effecting this purpose consist, secondly, in feeding the meal in a bolting-reel where atmospheric pressure is employed by means of a pump to prevent the air from escaping up the feed-pipe, as such escape would prevent the proper feeding of the reel; thirdly, in making the plunger of the pump to consist of a series of steps or offsets hollowed out or concave on their front sides to cut out the under portion of the meal, and thus to obviate its tendency to pack; fourthly, in a device for varying the quantity of meal fed to the bolt, whereby I am enabled to prevent the reel from choking; fifthly, in combining a flaring feeding-spout with a pump to feed the flour to the reel in the most perfect manner.

To carry out the objects of my invention in the most advantageous way, I have found it necessary to remodel almost entirely the bolting-chests heretofore used.

In the accompanying drawings, which represent a convenient arrangement of parts for carrying out the objects of my invention, my improvements are shown as applied to a series of three reels, arranged one above the other. In this instance the meal is shown as fed from the cooling-floor to the reel by means of a trough or spout, C, which enlarges gradually from one end to the other, as shown in the drawings, to prevent the packing of the meal. A pump, D, is placed across the lower end of the feeding-spout C to feed the meal to the reel. This pump consists of a reciprocating plunger, $d$, playing horizontally in a trough, $d'$, passing through the head of the bolting-reel.

In order to break down the meal more effectually I form a series of offsets or steps, 1 2, in the face of the plunger, as shown in Fig. 1 of the drawings. The plunger in this instance is formed of wood, and has a rod, $d^3$, screwed into its hinder end. This rod may pass through a block, $d^5$, in line with the path of the plunger, and act as a guide to it, in which case the pitman may be attached directly to the plunger itself. A better way, however, is to form a circular groove in the rod $d^3$ and connect the pitman to a collar, $d^4$, surrounding the rod, by a set-screw passing through the collar and into the groove.

To vary the depth to which the plunger enters the pump-barrel, and consequently the amount of feed, I loosen the set-screw sufficiently to permit the guide-rod to turn freely and screw it into or out of the plunger, and then tighten the screw again.

By means of the pump the reel is regularly supplied with meal, but the escape of the blast air up the spout is prevented. This same device may be used to discharge the flour and offal from the chest, as well as to feed the meal into it, and is, accordingly, shown as adapted to this purpose in the pumps X Y of Fig. 1. It may also under some circumstances be advantageously employed, even where no blast is used, to assist the bolting.

It is deemed unnecessary here to describe in detail the construction and operation of the other parts of the mechanism, as they form no part of the subject-matter herein claimed, and are, moreover, fully described in sundry other applications for Letters Patent filed simultaneously with this and marked, respectively, "A," "B," and "D."

What I claim under this patent as my invention is—

1. Feeding the meal to the bolting reel by means of a pump, for the purpose set forth.

2. Making steps or offsets 1 2 upon the plunger of the pump, for the purpose described.

2. The combination of the plunger $d$ and screw-rod $d^3$, substantially in the manner described, for the purpose of regulating the amount of feed to the reel.

4. The combination of a flaring feeding-spout with a pump, substantially in the manner described, for the purpose set forth.

In testimony whereof I have hereunto subscribed my name.

WILLIAM F. COCHRANE.

Witnesses:
S. A. BONINAN,
WARDER CUMMING.